Dec. 14, 1937.   A. E. OSBORN   2,102,434
PIPE JOINT
Filed Nov. 11, 1936
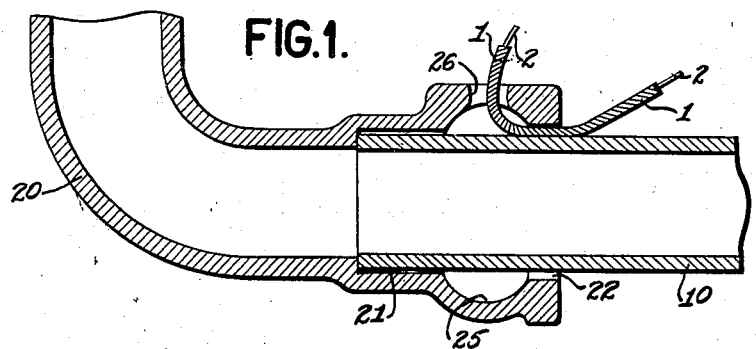
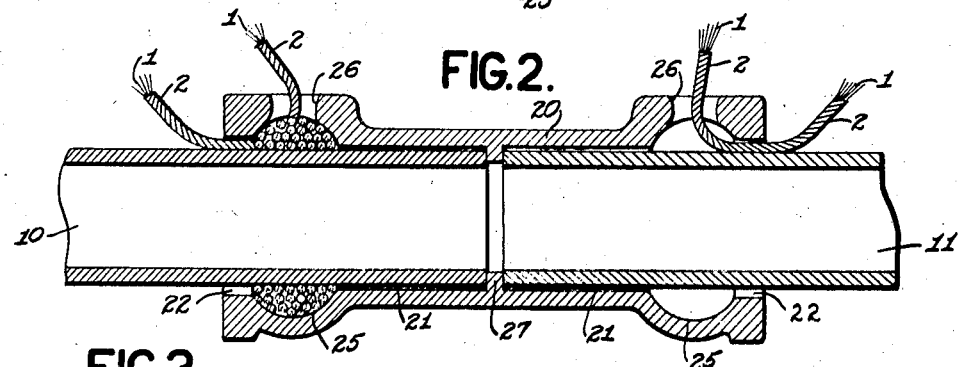
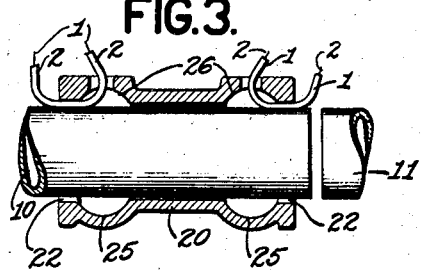
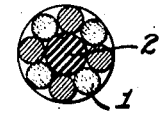
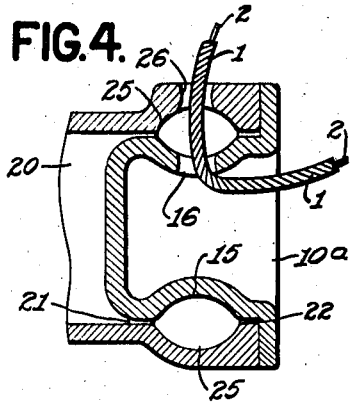
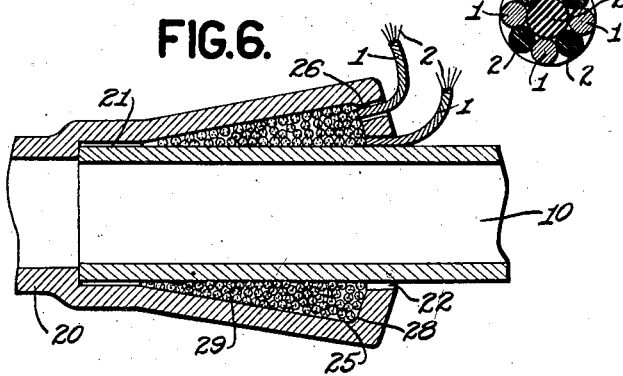
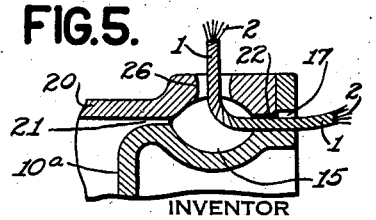
INVENTOR
Alden E. Osborn.

Patented Dec. 14, 1937

2,102,434

UNITED STATES PATENT OFFICE 2,102,434

PIPE JOINT

Alden E. Osborn, New York, N. Y.

Application November 11, 1936, Serial No. 110,196

5 Claims. (Cl. 285—163)

My invention relates to a pipe joint or means for attaching fittings or couplings to pipe or other objects, which not only firmly retains the parts to be connected in position, but also forms a leak-proof joint capable of withstanding considerable pressure. This joining means is very inexpensive, as threads, bolts, etc. are eliminated, and can be adapted to a large variety of conditions and uses without departure from the spirit and scope of the invention as defined in the appended claims.

In the accompanying drawing:—

Figure 1 represents a longitudinal sectional view of my invention applied between a pipe and a fitting.

Figure 2 represents a longitudinal sectional view of my invention applied to a coupling for connecting two pipes.

Figure 3 represents a longitudinal sectional view of the joining means of Figures 1 and 2 in a modified coupling permitting a different method of assembling the device.

Figure 4 represents a longitudinal section of my invention applied to a joint between a fitting or other article and a cover therefor.

Figure 5 represents a longitudinal part sectional view of a modification of Figure 4.

Figure 6 represents a longitudinal sectional view of a modification of my invention as illustrated in Figures 1, 2, 3, 4, and 5.

Figure 7 represents a cross sectional view of a form of retaining and packing means adapted to be used with my invention, and Figure 8 represents a cross sectional view of a modification of the retaining and packing means of Figure 7.

In Figure 1 my invention is arranged to fasten, with a leak-proof joint, the pipe or tube 10 into the fitting 20. This fitting 20 is provided with a socket which at 21 fits the pipe 10 with relatively little clearance while at 22 it has considerable clearance. Between these two different diameter parts the fitting is provided with a circumferential channel 25 and with an aperture 26 which perforates the wall of the fitting and opens into the channel. There is also provided, in order to complete my invention, a cord or rope formed of one or more strands 1 of metal or any other relatively hard and strong material and one or more strands 2 of a soft metal or a relatively soft material suitable for packing purposes, these strands 1 and 2 being twisted, braided, interwoven or otherwise fastened together.

The method of assembling this joint is as follows. The end of the cord 1—2 is passed thru the aperture 26 of the fitting 20 and out of the enlarged opening 22 of the socket therein and the pipe 10 is thereafter put in position within the socket with the cord 1—2 extending thru the clearance between the pipe and the enlarged part 22 of the socket opening. The pipe 10 (or fitting 20 if it is more convenient) is then turned with the end of the cord 1—2 that extends beyond the clearance held from movement relative to the pipe, with the result that the part of the cord 1—2 that extends outside of the aperture 26 will be pulled thru the aperture and wound about the pipe 10 until the channel 25 is filled to the extent desired to produce a tight joint and retain the pipe in position. Owing to the fact that the wire or wires 1 of the cord is or are of relatively strong material it is easily possible to obtain a very high pressure on the exterior of the pipe before the strain of pulling the cord thru the aperture is sufficient to break this wire or wires and, in some cases, an actual groove will be formed in the pipe 10 before the wire or wires break, thus holding the pipe very securely.

At the same time, the wire or wires 2 of the cord is or are compressed with a very high pressure and, while breakage may occur before the desired amount of wire 1 is in position, that part of the wire 2 that is already in the channel 25 would be subject to so much pressure that it would be caused to fill all points where leakage might take place and thus forms a very tight joint.

It will be noticed that the object of the clearance at 22 in the pipe socket of the fitting 20 is to enable the end of the cord 1—2 to pass outside of the fitting between it and the pipe 10 so that the end can be held from movement in relation to the pipe during the first turns of the pipe or fitting in the process of winding the cord into the socket and that this feature is in accordance with and serves the same purpose as the construction described and claimed in my patent for a Protector No. 1,949,431 of March 6, 1934, and will not be further dealt with herein.

It will also be noticed that the wire or wires 1 act as a retaining means while the wire or wires 2 act as a packing, and that, by combining both these functions in a single cord or rope, it is possible to simplify the application of the device by making it possible to wind the cord or rope into the joint from a single reel instead of from two reels as might be required with my pipe joint disclosed in my co-pending application serial No. 104,011 filed October 5, 1936. It also insures, unlike the device of that application, that a certain predetermined amount of packing material is wound into the channel in relation to the hard or retaining wire wound therein which would enable a leak-proof joint to be obtained without any special attention being given to the matter of inserting the required proportionate amounts of retaining and packing materials.

In Figure 2 is shown the joint illustrated in Figure 1 and just described applied to a coupling for joining pipe. In this figure a pipe joint of my design is at each end of the coupling 20 and one of them is shown as having the cord 1—2 wound in position while the other is shown with the cord 1—2 passed thru the aperture 26 and clearance at 22, but not yet wound about the pipe 11. The joint last to be tightened would preferably be made up by turning the pipe entering this joint, after the coupling had been applied to the other pipe by rotating the coupling. However, in some cases both joints between the coupling and pipes can be tightened simultaneously by rotating the coupling with both pipes stationary, provided the proportions of the parts and cords are such that approximately equal pressures can be obtained on both joints when the tightening is completed. A modification of this coupling design is illustrated in Figure 3 in which figure the coupling is shown in the course of its application to the ends of the two pipes 10 and 11. In the coupling of this figure the centralizing flange 27 of Figure 2 is eliminated thus permitting the coupling to be pushed entirely over the end of one of the pipes when the pipe line is being assembled and later moved to encompass the ends of both pipes before the cords are tightened. This arrangement has advantages in some cases.

In Figure 4 is shown another application of my invention, in that the fitting 20 may be the rim of an inspection opening of a tank or boiler or the end of a bottle, barrel, drum or container around the opening thereof, while, instead of the pipe 10, a plug or cover 10a is arranged to be held in this opening of the fitting or equivalent part. Owing to the fact that this plug 10a can, unlike the pipe 10 of the preceding figures, be especially formed it is, therefore, shown as provided with a channel 15 and also with an aperture 16 intersecting the channel whereby the ends of the cord 1—2 can be passed thru this aperture 16 and reached and held immovable in relation to the plug 10a while the cord is being wound into position. It will be noticed that the clearance at 22 of the preceding figures is rendered unnecessary and that the socket for the plug can, except for the channel, be of uniform diameter. This arrangement of my invention is, in certain of its features, related to and claimed in my patent for a Means for attaching members to the interior of hollow articles, No. 2,070,296, dated February 9, 1937. A small modification of the arrangement of my invention shown in Figure 4 is, however, shown in Figure 5 in which a clearance is provided at 22 for the cord 1—2 to pass thru so that it can be held and therefore, this particular design is, in this respect, similar to the device of my aforementioned Patent No. 1,949,431. The end of the cord 1—2 is, after being passed thru the clearance, shown as being passed thru a hole 17 in the flange of the plug so that the flange can bear against the fitting 20.

In Figure 6 is shown a modification of my pipe joint as shown in the previously described figures which modification is illustrated in combination with the Figure 1 type of fitting although it can be applied to any use and used in any way to which the preceding forms of my invention can be adapted. In this modification the channel 25 is changed in form and the aperture 26 intersects the channel thru its wall 28 towards the outer end of the fitting 20. The inner wall 29 of the channel is preferably arranged at a very small angle to the outside of the pipe 10 so that, as the cord 1—2 is wound into the channel thru the aperture 26, it is pressed longitudinally into this tapered portion of the channel with a wedge effect thus exerting a greater pressure on the outside of the pipe than would be obtained by the final winding of the cord against the largest diameter of the inside of the channel as occurs in the preceding form of my invention. This modification also has the advantage of having the aperture at a point distant from the inner end of the pipe about which leakage must take place and there is, therefore, more resistance to leakage taking place thru the aperture.

In Figure 7 a cross-section of one form of the cord is illustrated and it will be noted that the strong and hard element 1 is shown as the outer member to be twisted or woven about the center packing element 2, although the reverse arrangement can be used. With the packing element in the center, it should be made of a material sufficiently soft and plastic to squeeze between and around the hard outer retaining element under the pressure developed when the channel in the fitting is filled with the cord. A modified form of cord is illustrated in Figure 8 in which the retaining elements 1 and packing elements 2 of the cord is twisted or interwoven together. While the elements or wires 1 and 2 are shown in Figures 7 and 8 as being round and the completed cord is also substantially round in cross section, they need not necessarily take that form, as for instance the cord might be woven in the form of a tape as such a form might be desirable in some cases. In the foregoing description and the appended claims, the elements referred to as wire can in themselves be stranded or composed of a number of separate wires twisted or interwoven together or they may be a single homogeneous wire of such material and size that it can be readily bent in passing thru the aperture and winding about the pipe or internal member.

I claim:

1. A fitting having a channel and provided with an aperture intersecting said channel and a means for retaining a member within said fitting and for preventing leakage adjacent said means of retention, comprising a cord embodying a wire of relatively hard material and a wire of relatively soft material, both said wires being normally fastened together and adapted to be simultaneously wound thru said aperture and into said channel by relative rotation between said fitting and said member.

2. A fitting having a channel and provided with an aperture intersecting said channel, and a means for retaining a member within said fitting and preventing leakage adjacent said means of retention, comprising a cord embodying a plurality of wires, some of said wires being composed of materials having substantially different characteristics from other of said wires and all said wires being normally fastened together and adapted to be simultaneously wound thru said aperture and into said channel by relative rotation between said fitting and said member.

3. A means for forming a joint between an open-ended member and a member inserted within said open end of said first mentioned member, comprising a cord adapted to be inserted between the said members by relative rotation of the members, composed of integral elements having two substantially different characteristics.

4. A means for forming a joint between an open-ended member and a member inserted within said open end of said first mentioned member, comprising a cord, adapted to be inserted between the said members by relative rotation of the members, composed of a plurality of integral elements, some of said elements having substantially different characteristics from other of said elements.

5. A means for forming a joint between an open-ended member and a member inserted within said open end of said first mentioned member, comprising a cord, adapted to be inserted between the members by relative rotation of the members, composed of a plurality of integral elements, some of said elements being of relatively great hardness and strength, and other of said elements being relatively soft and plastic.

ALDEN E. OSBORN.